(12) United States Patent
Nakaishi

(10) Patent No.: US 12,420,320 B2
(45) Date of Patent: Sep. 23, 2025

(54) PROCESSING APPARATUS, PROCESSING METHOD, AND POWDER BODY

(71) Applicant: GLENCAL TECHNOLOGY CO., LTD., Tokyo (JP)

(72) Inventor: Masahito Nakaishi, Tokyo (JP)

(73) Assignee: GLENCAL TECHNOLOGY CO., LTD., Tokyo (JP)

( * ) Notice: Subject to any disclaimer, the term of this patent is extended or adjusted under 35 U.S.C. 154(b) by 1097 days.

(21) Appl. No.: 17/425,252

(22) PCT Filed: Jan. 23, 2020

(86) PCT No.: PCT/JP2020/002423
§ 371 (c)(1),
(2) Date: Jul. 22, 2021

(87) PCT Pub. No.: WO2020/153455
PCT Pub. Date: Jul. 30, 2020

(65) Prior Publication Data
US 2022/0088651 A1 Mar. 24, 2022

(30) Foreign Application Priority Data
Jan. 23, 2019 (JP) .................. 2019-009817

(51) Int. Cl.
*B09B 3/50* (2022.01)
*A23K 10/37* (2016.01)
(Continued)

(52) U.S. Cl.
CPC ................ *B09B 3/50* (2022.01); *A23K 10/37* (2016.05); *A23N 17/004* (2013.01);
(Continued)

(58) Field of Classification Search
CPC .......... B01F 23/30; B01F 23/34; B01F 27/70; B01F 2101/25; B01F 2035/99;
(Continued)

(56) References Cited

U.S. PATENT DOCUMENTS

2015/0164108 A1 6/2015 Logan et al.

FOREIGN PATENT DOCUMENTS

JP H05-163089 6/1993
JP H07-136629 5/1995
(Continued)

OTHER PUBLICATIONS

Translation, JP-2003047938-A (Year: 2003).*
(Continued)

*Primary Examiner* — Jessica Yuen
(74) *Attorney, Agent, or Firm* — Wentsler LLC

(57) ABSTRACT

Provided is a processing apparatus for processing water-containing organic matters. The processing apparatus includes: a processing tank configured to store the water-containing organic matters; a stirring unit configured to stir the water-containing organic matters; a heater configured to heat the processing tank; an exhaust unit configured to exhaust gas from the processing tank at a rate from 1 m³/min to 300 m³/min; and an ion gas supply unit configured to supply ion gas into the processing tank with the exhaustion of the gas from the interior of the processing tank, the ion gas having an ion density of at least 2,000,000 pcs/cc, wherein the heater heats an interior of the processing tank while the stirring unit stirs the water-containing organic matters, and the ion gas is supplied into the processing tank according to the exhaustion by the exhaust unit, whereby processing the water-containing organic matters.

6 Claims, 2 Drawing Sheets

(51) Int. Cl.
  *A23N 17/00*  (2006.01)
  *B09B 3/38*   (2022.01)
  *B09B 3/40*   (2022.01)
  *B09B 101/70* (2022.01)
  *C05F 5/00*   (2006.01)

(52) U.S. Cl.
  CPC .............. *A23N 17/007* (2013.01); *B09B 3/38* (2022.01); *B09B 3/40* (2022.01); *C05F 5/002* (2013.01); *B09B 2101/70* (2022.01)

(58) Field of Classification Search
  CPC ......... B01F 2101/33; B09B 3/50; B09B 3/38; B09B 3/40; B09B 2101/70; B09B 3/00; B09B 5/00; A23K 10/37; A23K 10/26; A23K 40/00; A23N 17/004; A23N 17/007; A23N 17/001; A23N 17/008; A23N 17/00; C05F 5/002; C05F 1/002; C05F 1/005; C05F 1/02; C05F 5/00; C05F 5/004; C05F 7/00; C05F 9/02; C05F 11/08; C02F 11/02; C02F 11/185; C02F 2103/22; C02F 2103/32; C02F 2209/02; C02F 2303/02; C02F 11/13; A23V 2002/00; Y02P 20/145; Y02P 60/87; Y02W 10/20; Y02W 30/20; Y02A 40/20
  See application file for complete search history.

(56) References Cited

FOREIGN PATENT DOCUMENTS

| JP | 2002-355002 | | 12/2002 |
|---|---|---|---|
| JP | 2003047938 | A * | 2/2003 |
| JP | 2004-66196 | | 3/2004 |
| JP | 2005-118743 | | 5/2005 |
| JP | 2006055761 | A * | 3/2006 |
| JP | 2007252346 | | 10/2007 |
| JP | 4280850 | | 6/2009 |
| JP | 2011-206665 | A | 10/2011 |
| KR | 20180112348 | | 10/2018 |
| NZ | 765167 | | 1/2022 |

OTHER PUBLICATIONS

Translation, JP-2006055761-A (Year: 2006).*
Office action dated Mar. 21, 2024 in corresponding Korean Patent Application No. 10-2021-7026156.
Patent Examination Report dated Dec. 21, 2023 in corresponding New Zealand Patent Application No. 778863.
Office action dated Aug. 17, 2022, in corresponding application in China, Appl. No. 202080008859.0.
International Search Report dated Feb. 18, 2020 in PCT application PCT/JP2020/002423.
Sancho, P, et al., "Microbiological characterization of food residues for animal feeding", Waste Management, vol. 24, No. 9, Jan. 1, 2004, pp. 919-926.
Extended European Search Report dated Jul. 15, 2022 in corresponding application in Europe, EP20745811.8.
Office action dated Jan. 29, 2025 in corresponding European Patent Application No. 20745811.8.
Kyhumer et al, "Research and Application of Large Scale Negative Ion Anti-Fire Extinguishing Devices," Proceedings of the Tenth National Conference on Mining and Academic Proceedings-Topics Two: Safety Technology and Engineering, Dec. 2015, pp. 184-189 [cited in Office action dated Aug. 17, 2022, in corresponding application in China, Appl. No. 202080008859.0].

* cited by examiner

PROCESSING APPARATUS, PROCESSING METHOD, AND POWDER BODY

TECHNICAL FIELD

The present invention relates to a processing apparatus, a processing method, and a powder body and is suitable for application in processing water-containing organic matters, such as vegetable waste.

BACKGROUND ART

In the related art, water-containing organic matters such as food waste have been processed through a decomposition using aerobic bacteria. General food waste processing apparatus employs a method of storing culture base material such as sawdust, rice husks, and so forth in a processing tank equipped with blades and a ventilation system and stirring the food waste crushed by a crusher together in the tank.

It has also been proposed that ozone is used for sterilizing and decomposing molecules, which may be an origin of bacteria and bad odor exhausted into the atmosphere and converting such molecules into harmless molecules before releasing to an atmosphere (for example, see Patent Literature 1).

CITATION LIST

Patent Literature

PTL 1: JP-A-7-136629

SUMMARY OF INVENTION

Technical Problem

The technology in PTL 1 described above has a problem that the water-containing organic matters may fail to be processed and decay when the culture base material does not work well. The above technology also has a problem that an amount of the water-containing organic matters that can be put into the processing tank is obliged to be subtracted by an amount corresponding to the culture base material, which results in difficulty in efficient processing of the water-containing organic matters.

It is an object of the present invention to provide a processing apparatus and a processing method, which enable more efficient processing of the water-containing organic matters and a powder body manufactured thereby.

Solution to Problem

A processing apparatus, according to the present invention, is a processing apparatus for processing water-containing organic matters, including: a processing tank configured to store the water-containing organic matters; a stirring unit configured to stir the water-containing organic matters stored in the processing tank; a heater configured to heat the processing tank; an exhaust unit configured to exhaust gas from the processing tank at a rate from 1 m$^3$/min to 300 m$^3$/min; and an ion gas supply unit configured to supply ion gas into the processing tank with the exhaustion of the gas from the interior of the processing tank, the ion gas having an ion density of at least 2,000,000 pcs/cc, wherein the heater heats an interior of the processing tank while the stirring unit stirs the water-containing organic matters, and the ion gas is supplied into the processing tank according to the exhaustion by the exhaust unit, whereby processing the water-containing organic matters.

A processing method, according to the present invention, is a processing method for processing water-containing organic matters, the method including: storing the water-containing organic matters in a processing tank; stirring the water-containing organic matters stored in the processing tank by a stirring unit; heating an interior of the processing tank by a heater; exhausting gas from the interior of the processing tank by an exhaust unit at a rate from 1 m$^3$/min to 300 m$^3$/min; and supplying ion gas into the processing tank with the exhaustion of the gas from the interior of the processing tank, the ion gas having an ion density of at least 2,000,000 pcs/cc, wherein the heater heats an interior of the processing tank while the stirring unit stirs the water-containing organic matters, and the ion gas is supplied into the processing tank according to the exhaustion by the exhaust unit, whereby processing the water-containing organic matters.

A powder body of the present invention is a powder body obtained from water-containing organic matters, and the powder body has a moisture content of 20% or less and a bacterial count of mesophilic aerobic bacteria of 10$^5$/g or less and is used as a fertilizer or feed.

Advantageous Effects of the Invention

According to the present invention, the water-containing organic matters are processed by using a method including stirring the water-containing organic matters, heating the interior of the processing tank, exhausting gas from the interior of the processing tank, and supplying ion gas into the processing tank so that compared to a case in the related art where the culture base material is used, a space in the processing tank by an amount corresponding to the culture base material can be utilized efficiently, which may result in more efficient processing. In addition, the powder body obtained by efficiently processing the water-containing organic matters may be provided.

DESCRIPTION OF EMBODIMENTS

Figure 1:
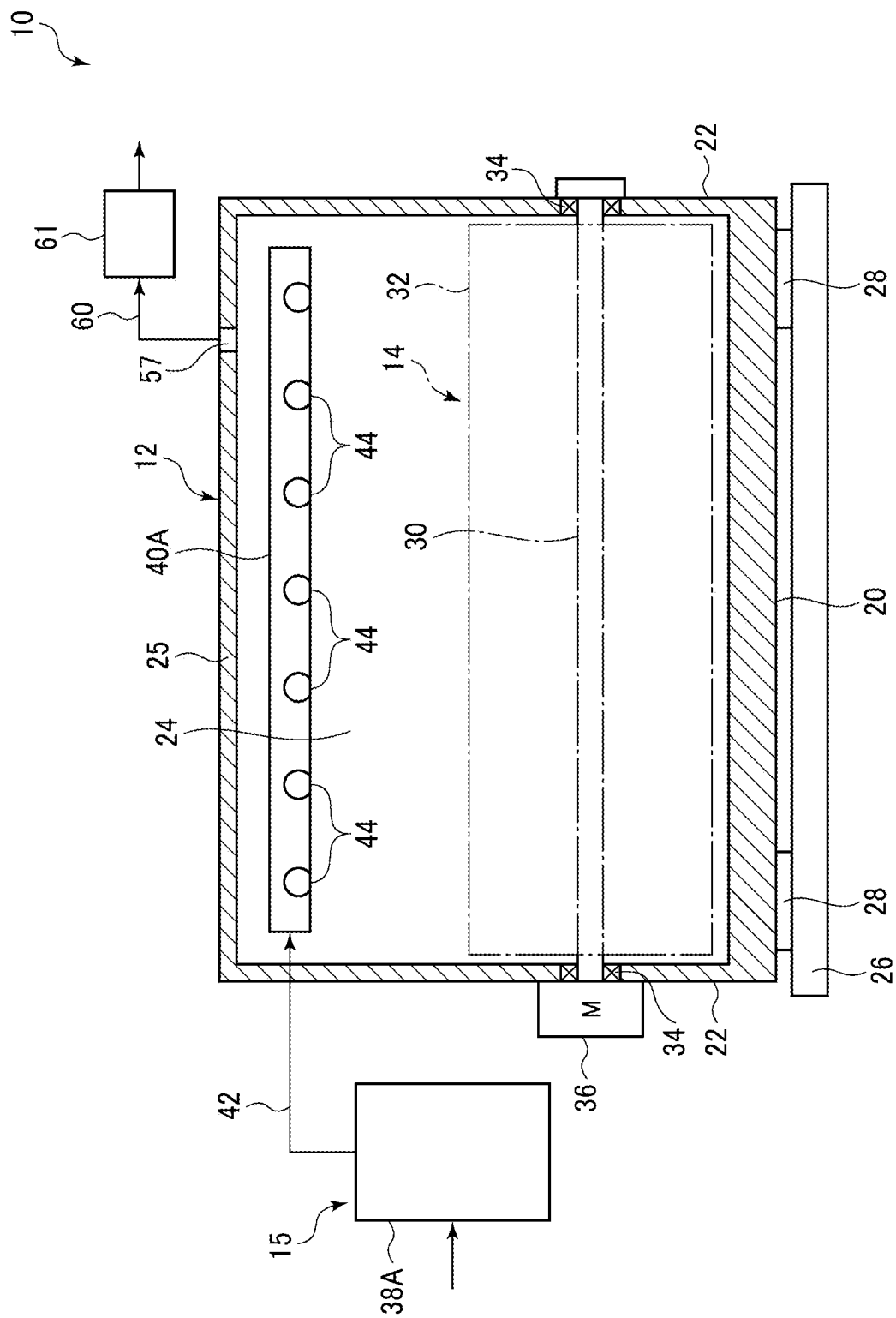
FIG. 1 is a cross-sectional view illustrating a sectional configuration of a processing apparatus according to an embodiment when viewed from a side.

Referring to the drawings, an embodiment of the present invention will be described below in detail.

(1) <Overall Configuration of Processing Apparatus>

Figure 2:
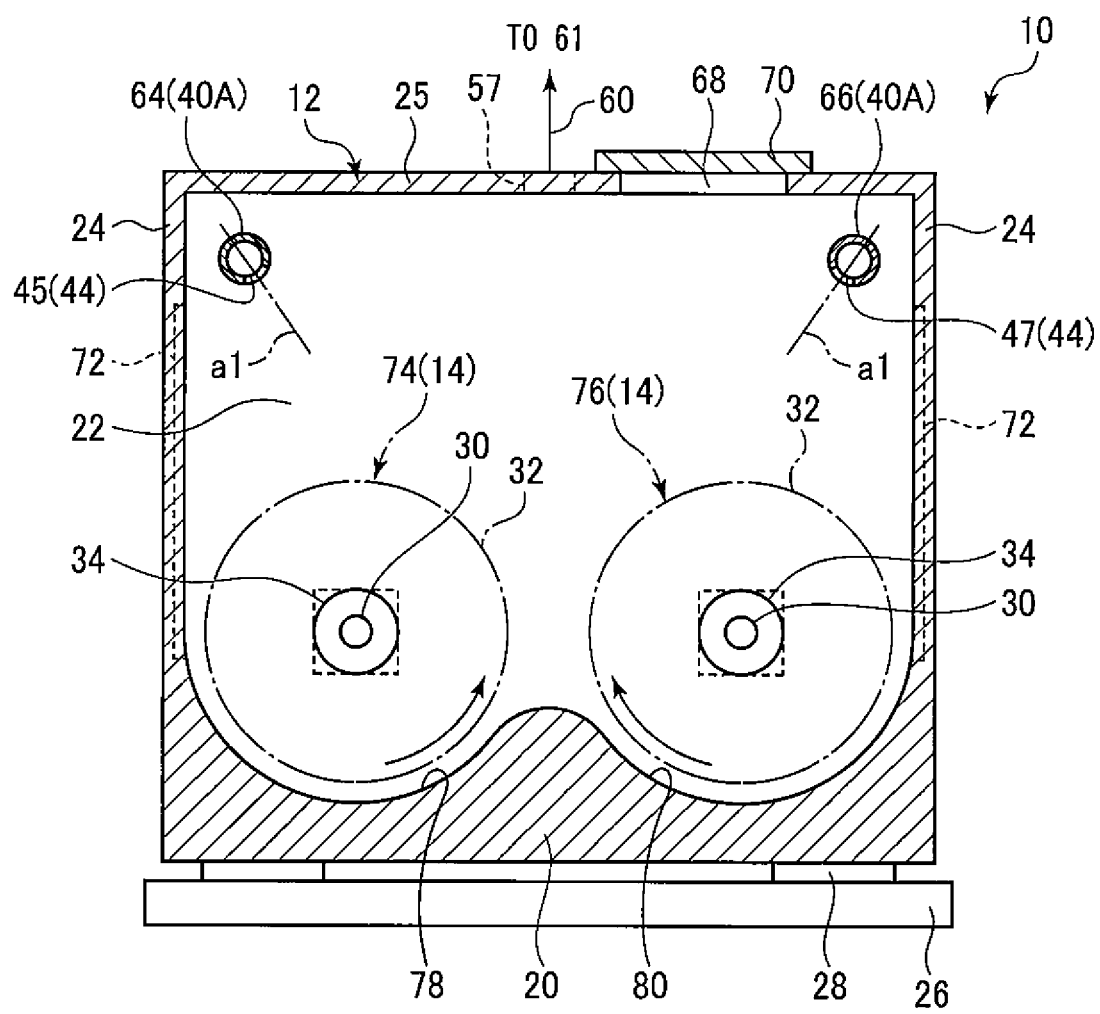
FIG. 2 is a cross-sectional view illustrating a sectional configuration of the processing apparatus according to the embodiment when viewed from an end.

FIG. 1 is a cross-sectional view illustrating a sectional configuration of a processing apparatus 10 in the present embodiment when viewed from a side 24, and FIG. 2 is a cross-sectional view illustrating a sectional configuration of the processing apparatus 10 when viewed from an end 22. As illustrated in FIG. 1 and FIG. 2, the processing apparatus 10 includes: a processing tank 12, a stirring unit 14, an ion gas supply unit 15, an exhaust unit 61, and a heater 72, and is configured to process water-containing organic matters stored in the processing tank 12. The water-containing organic matters include, for example, vegetable waste, fruit waste, organic residue after beverage extraction, meat waste, fish waste such as salmon, sewage, and waste food. The organic residues after beverage extraction, which is one of the water-containing organic matters, include apple lees, tangerine lees, grape lees, grapefruit lees, peach lees, carrot lees, green pepper lees, liquor lees, used green tea leaves, barley tea residue, and coffee grounds, for example.

The processing tank 12 includes a bottom portion 20, a pair of ends 22 arranged opposite each other in a longitudinal direction (FIG. 1) and a pair of sides 24 arranged opposite each other in a short-side direction (FIG. 2), and an upper portion 25 to form a sealed space inside. The processing tank 12 may be formed, for example, of fiber-reinforced plastics (FRP), but not limited thereto. The bottom portion 20 of the processing tank 12 is provided with a base 26 via a load cell 28.

The processing tank 12 in the present embodiment is set to have the sealed space having a length of approximately 4.5 m in the longitudinal direction, in which the pair of ends 22 oppose each other, a width of approximately 2.3 m in the short-side direction in which the pair of sides 24 oppose each other, and a height of approximately 1.6 m from the upper portion 25 to the lowest points of curved surfaces 78, 80 of the bottom portion 20.

The load cell 28 measures a load applied from the processing tank 12 installed on the load cell 28, and upon reception of a reset command from an operation panel (not illustrated), sets a measured value received at the time of reception of the reset command as a reference value. Accordingly, the load cell 28 receives a reset command immediately after a water-containing organic matter is put in the processing tank 12, and then is able to set the weight of the water-containing organic matter before processing as a reference value and can measure a tendency of reduction in weight of the water-containing organic matter during the processing and the weight of the water-containing organic matter after the processing has completed.

The upper portion 25 includes a inlet opening 68 opening at a predetermined position in a thickness direction, and a lid 70 configured to open and close the inlet opening 68. The lid 70 is rotatably fixed to the upper portion 25 via a hinge at one end thereof to open and close the inlet opening 68. Accordingly, the water-containing organic matter is loaded into the processing tank 12 through the inlet opening 68 exposed with the lid 70 opened and is stored in the sealed processing tank 12 with the lid 70 closed.

As illustrated in FIG. 2, the sides 24 are respectively provided with the heaters 72, such as hot wire heaters or PTC heaters. The heaters 72 heat the interior of the processing tank 12 to shift the temperature in the processing tank 12 in a range from 25° C. to 70° C. The temperature in the processing tank 12 is a value measured by a thermometer installed in the sealed space in the processing tank 12 in which the water-containing organic matter is stored.

In this manner, the phenomenon that the temperature in the processing tank 12 shifts within the range from 25° C. to 70° C. is caused by the change in temperature in the processing tank 12 according to the state of processing of the water-containing organic matter. However, an average temperature in the processing tank 12 when the temperature in the processing tank 12 falls within the range from 25° C. to 70° C. preferably falls within a range from 30° C. to 50° C. The average temperature in the processing tank 12 is an average temperature obtained by measuring the temperature in the processing tank 12 by a plurality of times at predetermined intervals or at any timing when the temperature in the processing tank 12 falls within the range from 25° C. to 70° C. by being heated by the heater 72, and finally completing the processing of the water-containing organic matter.

When the water-containing organic matter is processed by a heating process with an average temperature in the processing tank 12 lower than 30° C., the water-containing organic matter can hardly be dried. Therefore, the average temperature in the processing tank 12 is preferably 30° C. or higher. If the water-containing organic matter is processed by a heating process such that the average temperature in the processing tank 12 exceeds 50° C., the water-containing organic matter may be dried excessively, and thus the water-containing organic matter tends to diffuse into an atmosphere in the form of dust. Therefore, at the time of completion of the processing the average temperature in the processing tank 12 is preferably 50° C. or lower.

The stirring unit 14 provided in the processing tank 12 includes, as illustrated in FIG. 2, a first stirring unit 74 arranged on one side and a second stirring unit 76 arranged on the other side of the processing tank 12 in the short-side direction. The first stirring unit 74 and the second stirring unit 76 have the same configuration and include, as illustrated in FIG. 1, a rotating shaft 30 disposed between the ends 22, and blades 32 provided on the rotating shaft 30. The rotating shaft 30 is supported by bearings 34 provided respectively at the ends 22 in a rotatable manner with respect to the processing tank 12. One end of the rotating shaft 30 is connected to a drive unit 36.

In the case of the present embodiment, the first stirring unit 74 rotating counterclockwise and the second stirring unit 76 rotating clockwise stir the water-containing organic matter stored in the processing tank 12 to guide from the bottom portion 20 side of the processing tank 12 toward between the first stirring unit 74 and the second stirring unit 76.

The bottom portion 20 includes arcuate curved surfaces 78, 80 along the first stirring unit 74 and the second stirring unit 76. The curved surfaces 78, 80 are formed along trajectories of circular rotations of the respective blades 32 of the first stirring unit 74 and the second stirring unit 76 that rotate about the rotating shaft 30.

In addition to the above configuration, the upper portion 25 of the processing tank 12 in the present embodiment is provided at a predetermined position with an exhaust port 57 penetrating therethrough in the thickness direction. The exhaust unit 61 is connected to the exhaust port 57 via a flow channel 60. The exhaust unit 61 is, for example, a blower and is configured to suck gas in the processing tank 12 and exhausts the gas in the processing tank 12 to outside during the processing of the water-containing organic matter in the processing tank 12.

In the present embodiment, the exhaust unit 61 preferably exhausts the gas from the processing tank 12 at a rate ranging from 1 m$^3$/min to 300 m$^3$/min, more preferably from 50 m$^3$/min to 300 m$^3$/min. The amount of gas exhausted from the processing tank 12 corresponds to the amount of gas exhausted from the exhaust unit 61, which exhausts the gas in the processing tank 12 to the atmosphere and may be adjusted to a desired amount of exhaustion by adjusting a set value of the blower assuming that the blower is employed as the exhaust unit 61.

The processing tank 12 receives a supply of ion gas (here, negative-ion-containing gas (for example, negative-ion-containing air)) from the ion gas supply unit 15, which will be described later, by an amount corresponding to the amount of the gas exhausted from the processing tank 12. In this case, exhausting the gas from the processing tank 12 at a rate of 1 m$^3$/min or higher may allow for maintenance of the amount of supply of the ion gas from the ion gas supply unit 15, described later, to the processing tank 12 at an optimal value, and may also allow for appropriate circulation of the gas in the processing tank 12 to prevent the occurrence of condensation in the processing tank 12, which may result in acceleration of water vaporization of the water-containing organic matter. A rate of 50 m$^3$/min or higher may allow for an increase in the amount of supply of the ion gas from the ion gas supply unit 15, and also may allow for an acceleration in the circulation of the gas in the processing tank 12 to ensure an effect of prevention of occurrence of condensation.

On the other hand, exhausting the gas from the processing tank 12 at a rate of 300 m$^3$/min or lower allows for retention of the ion gas introduced from the ion gas supply unit 15 to the processing tank 12 in the processing tank 12, and prevention of the water-containing organic matter from transforming to dust due to excessive evaporation of the moisture in the water-containing organic matter caused by circulating gas in the processing tank 12.

The ion gas supply unit 15 includes a negative ion generator 38A, an upper supply tube 40A including upper nozzles 44, and a flow channel 42 communicating the negative ion generator 38A and the upper supply tube 40A. The ion gas supply unit 15 makes the negative ion generator 38A generate negative ions, for example, by corona discharge or thermal ionization, supplies ion gas containing negative ions through the flow channel 42 to the upper supply tube 40A, and discharges the ion gas from the upper nozzles 44 of the upper supply tube 40A into the processing tank 12.

In the present embodiment, the atmosphere is sucked from the negative ion generator 38A along with the exhaustion of gas from the processing tank 12 to generate negative ions in the gas passing through the negative ion generator 38A. The negative ion generator 38A ionizes gas molecules, for example, by detaching electrons from gas molecules such as oxygen and nitrogen contained in the atmosphere.

In the present embodiment, the amount of supply of the ion gas from the ion gas supply unit 15 to the processing tank 12 is adjusted by adjusting the amount of exhausted gas from the processing tank 12 by the exhaust unit 61. In this case, the ion gas supplied from the ion gas supply unit 15 to the processing tank 12 has an ion density of 2,000,000 pcs/cc or higher, preferably 20,000,000 pcs/cc or higher, and more preferably 60,000,000 pcs/cc or higher.

Negative ions used for the food waste processing apparatus of the related art are used for deodorizing the interior of the food waste processing apparatus and are not used from the viewpoint of directly affecting and processing the water-containing organic matters such as the food waste. Therefore, ion gas generated in the food waste processing apparatus is as thin as being diffused in odor (gas) in the food waste processing apparatus and is not considered to be sparse enough to diffuse the negative ions also into the food waste.

In contrast, in the present embodiment, the ion density in the processing tank 12 is 2,000,000 pcs/cc or higher, preferably 20,000,000 pcs/cc or higher, and more preferably 60,000,000 pcs/cc or higher to achieve the ion density in the processing tank 12 much higher than that in the food waste processing apparatus used for deodorization of the related art, so that diffusion of the negative ions in the ion gas into the water-containing organic matter is ensured, thereby promoting separation of water molecules from the water-containing organic matter. The water molecules separated from the water-containing organic matter ascend in the processing tank 12, and part of the water molecules described above, being subjected to breakage of the cluster structure in which a plurality (for example, five or six) of the water molecules are bound together while ascending, evaporates and is discharged to the outside by the exhaust unit 61.

In contrast, the remaining water molecules, that is, the water molecules having the cluster structure maintained, stay at a boundary between the water-containing organic matter being stirred and a space in the processing tank 12 filled with gas. However, the ion gas is blown to the boundary described above, and thus the negative ions in the ion gas decompose the cluster structure of the water molecules. The water molecules having subjected to the decomposition of the cluster structure are easily evaporated by the calorific power from the heater 72 and are discharged to the outside by the exhaust unit 61.

As described above, by increasing the ion density of the ion gas to a high density, the ion gas separates the water contained in the water-containing organic matter from the water-containing organic matter, and the ion gas decomposes the cluster structure of the water molecules. Therefore, the processing apparatus 10 may reduce the weight of the water-containing organic matter easily by the evaporation of the water contained therein.

An ion density of 20,000,000 pcs/cc or higher in the processing tank 12 make it much easier to diffuse the negative ions into the water-containing organic matter, and thus the water contained in the water-containing organic matter can be separated from the water-containing organic matter by the ion gas and decomposition of the cluster structure of the water molecules can be accelerated correspondingly. An ion density of 60,000,000 pcs/cc or higher in the processing tank 12 can further ensure the diffusion of the negative ions in the water-containing organic matters.

The upper supply tube 40A that communicates with the negative ion generator 38A includes the upper nozzles 44 each made, for example, of a circular opening at predetermined positions at predetermined intervals. The upper supply tube 40A is disposed parallel to the rotating shaft 30 and is provided at a position above the rotating shaft 30.

In the case of the present embodiment, the upper supply tube 40A is disposed at a position above the stored water-containing organic matter when the water-containing organic matter is stored in the processing tank 12 so as to be able to inject ion gas from above the water-containing organic matter via the upper nozzles 44 without being buried in the stored water-containing organic matter when the water-containing organic matter is stored in the processing tank 12.

The upper supply tube 40A includes a first pipe 64 and a second pipe 66 disposed on both sides with the exhaust port 57, which is provided at a center of the processing tank 12 in the short-side direction interposed therebetween. The first pipe 64 is disposed so as to extend along one side 24 (the side on the left in FIG. 2), and the second pipe 66 is disposed so as to extend along the other side 24 (the side on the right in FIG. 2).

The first pipe 64 is formed with a first upper nozzle 45 as one of the upper nozzles 44, and the second pipe 66 is formed with a second upper nozzle 47 as one of the upper nozzles 44. The first upper nozzle 45 and the second upper nozzle 47 preferably open in a range from a central orientation of the processing tank 12 in a horizontal direction to a downward orientation in a vertical direction.

In the present embodiment, a line a1 connecting between a center portion of the first pipe 64 and the first upper nozzle 45 and a line a1 connecting between a center portion of the second pipe 66 and the second upper nozzle 47 extend toward a portion between the first stirring unit 74 and the second stirring unit 76. Accordingly, the first pipe 64 and the second pipe 66 inject ion gas toward a boundary between the water-containing organic matter introduced from the bottom portion 20 of the processing tank 12 toward between the first stirring unit 74 and the second stirring unit 76 and a space in the processing tank 12 filled with gas.

(2) <Method of Processing Water-Containing Organic Matter Using Processing Apparatus>

Next, a method of processing water-containing organic matters using the processing apparatus 10 will be described. In this case, a user loads a water-containing organic matter to be processed into the processing tank 12 and stores the water-containing organic matter in a sealed space in the processing tank 12 (storing). The user then issues a process start command via an operating panel (not illustrated) of the processing apparatus 10 to drive the stirring unit 14, the exhaust unit 61, the heater 72, and the negative ion generator 38A and starts processing of the water-containing organic matter in the processing apparatus 10.

In this case, the processing apparatus 10 drives the stirring unit 14 and stirs the water-containing organic matter in the processing tank 12 when the process start command is issued (stirring). In this case, stirring of the water-containing organic matter by the stirring unit 14 is done to the extent that the water-containing organic matter can circulate in the entire processing tank 12.

The processing apparatus 10 drives the exhaust unit 61 when the process start command is issued, starts exhausting the gas from the processing tank 12 at a rate ranging from 1 m³/min to 300 m³/min (exhausting) and drives the negative ion generator 38A to generate negative ions in the gas.

The negative ion generator 38A sucks the atmosphere by an amount corresponding to the amount of the gas exhausted from the processing tank 12 by the exhaust unit 61 and ionizes gas molecules by detaching electrons from gas molecules such as oxygen and nitrogen contained in the atmosphere. At this time, the amount of exhaustion by the exhaust unit 61 is adjusted, and the ion gas having an ion density of 2,000,000 pcs/cc or higher, preferably 20,000,000 pcs/cc or higher, and more preferably 60,000,000 pcs/cc or higher is supplied from the ion gas supply unit 15 into the processing tank 12, so that the processing tank 12 is filled with the ion gas (supplying ion gas).

At this time, the processing apparatus 10 drives the heater 72, heats the interior of the processing tank 12, shifts the temperature in the interior of the processing tank 12 within the range from 25° C. to 70° C., and adjusts an average temperature in the processing tank 12 at the time of completion of the processing within this temperature range to fall within a range from 30° C. to 50° C. (heating).

In this manner, the processing apparatus 10 performs stirring of the water-containing organic matter, heating the interior of the processing tank 12, exhaustion of gas from the interior of the processing tank 12, and supply of the ion gas having at least a predetermined value of ion density into the processing tank 12 continuously for a predetermined time.

Accordingly, the processing apparatus 10 stirs and heats the water-containing organic matter, circulates gas in the processing tank 12 by exhaustion, and supplies ion gas into the processing tank 12, and by the synergistic effects of these operations, makes water molecules contained in the water-containing organic matter easily separate and decompose the water-containing organic matter, and decomposes the cluster structure of water molecules, thereby efficiently decomposing the water-containing organic matter. Accordingly, the water-containing organic matter processed by the processing apparatus 10 ultimately may become a powder body having a desired moisture content and a significantly reduced weight compared to the water-containing organic matter of the initial state.

When the powder body obtained by processing the water-containing organic matter is used as a fertilizer or feed, the time to terminate the processing of the water-containing organic matter may be determined by using the moisture content of the water-containing organic matter. More specifically, the processing of the water-containing organic matter is preferably terminated when the moisture content of the powder body ranges from 2% to 20%, more preferably from 10% to 20%. The moisture content is a value measured by a loss on drying method. The loss on drying method includes measuring the weight of the water-containing organic matter before processing containing water, heating the water-containing organic matter to evaporate water, then measuring the weight of the water-containing organic matter with zero moisture, thereby assuming the reduced weight to be moisture to measure the moisture content.

When the moisture content of the powder body obtained by processing the water-containing organic matter is less than 2%, the powder body is excessively dry and becomes dust, and the powder body may be flown up into the atmosphere when the processing tank 12 is opened. Therefore, the moisture content of the powder body is preferably 2% or greater. Reducing the powder body having a moisture content not more than 20% can suppress the bacterial count of mesophilic aerobic bacteria to $10^5$/g or less, so that the powder body can be used as a fertilizer or feed. When the powder body is used as fertilizer or feed, the moisture content of the powder body is preferably within a range from 10% to 20% for ease of handling.

The processing time of such water-containing organic matter varies depending on the amount of loaded water-containing organic matter, a type of the water-containing organic matter, a moisture state of the water-containing organic matter, a heating temperature in the processing tank 12, an amount of supply of the ion gas, the amount of exhausted gas from the processing tank 12, and so forth. However, if the water-containing organic matter is general vegetable waste and organic residue after beverage extraction having a moisture content ranging from 40% to 90% and a weight ranging approximately from 30 kg to 300 kg, a powder body having a moisture content of 20% or less can be obtained by processing the water-containing organic matter by setting the ion density to 60,000,000 pcs/cc or higher continuously for a time period ranging from 2 hours to 70 hours under the above-described processing conditions, for example.

In general, in the processing tank having a low temperature such as 50° C. or lower, it is difficult to suppress the bacterial count of mesophilic aerobic bacteria in the water-containing organic matter to $10^5$/g or less. However, the processing apparatus 10 stirs the water-containing organic matter, circulates gas in the processing tank 12, and supplies ion gas to the water-containing organic matter when processing the water-containing organic matter, so that even when the average temperature in the processing tank 12 is reduced to 50° C. or lower, the bacterial count of mesophilic aerobic bacteria in the powder body can be suppressed to $10^5/g$ or less in a short time by the synergistic effects of these operations.

In addition to those described above, if the reduction of the total amount of the water-containing organic matter by processing the water-containing organic matter is intended, the processing time for the water-containing organic matter can be determined according to the results of weight measurement of the water-containing organic matter obtained by the load cell 28. The processing apparatus 10, under the above-described processing conditions, is capable of reducing the water-containing organic matter before processing in the processing tank 12 to a range from one-eighth to one-third by processing the water-containing organic matter continuously for a time period from 2 hours to 70 hours.

In this case, the processing apparatus 10 detects that the weight of the water-containing organic matter before processing in the processing tank 12 is reduced to a range from one-eighth to one-third by the load cell 28 and notifies users via sounds or lights, so that the completion of processing of the water-containing organic matter can be notified to the users.

(3) <Fertilizer or Feed>

Next, the powder body obtained by processing the water-containing organic matter by the processing apparatus 10 may be reduced in moisture content to 20% or less and may be used as a fertilizer or feed because of high nutritional value thereof. The water-containing organic matters which may be fertilizer or feed include, for example, vegetable waste, fruit waste, organic residue after beverage extraction, meat waste, fish waste such as salmon, sewage, and waste food as described above, and the organic residues after beverage extraction include apple lees, tangerine lees, grape lees, grapefruit lees, peach lees, carrot lees, green pepper lees, liquor lees, used green tea leaves, barley tea residue, and coffee grounds, for example.

When manufacturing a fertilizer or feed from these water-containing organic matters, the processing time may vary slightly depending on the type of the water-containing organic matter, and thus the fertilizer or feed is preferably manufactured by processing each of the water-containing organic matters by the processing apparatus 10 without mixing a plurality of types of the water-containing organic matters.

In the related art, the moisture content of the powder body manufactured by the food waste processing apparatus configured to heat and process the water-containing organic matter such as food waste while crushing may increase with time and exceed 20% even when the moisture content immediately after the manufacture is set to 20% or less. As a result, the bacterial count of mesophilic aerobic bacteria in the powder body is increased to $10^8/g$ or greater, and decomposition starts, so that long-term storage may be difficult.

On the other hand, the powder body obtained by using the processing apparatus 10 and processing, for example, coffee grounds and apple lees had been left untouched at room temperature (20° C.±15° C. (5 to 35° C.)) for about one year after manufacture, and when the moisture content was measured about one year after manufacture, it was confirmed that the moisture content was still 20% or less. From this, it can be inferred that while the moisture content of the powder body is 20% or less, the moisture content remains 20% or less for a long time because, unlike the related art, many cell walls of the powder body are not destroyed.

Therefore, a long-term storable fertilizer or feed that can maintain a moisture content of 20% or less for a long period of time may be provided. A verification test of the moisture content of the powder body manufactured by the processing apparatus 10 after long-term storage will be described in detail in "(6) <Verification Test on Powder Body manufactured by Processing Apparatus of Present Embodiment>" below.

Here, 200 kg of apple lees having a moisture content of 78.9% after beverage extraction was prepared and processed continuously for 42 hours under the above-described processing conditions in the processing apparatus 10 of the present embodiment with an ion density of about 60,000,000 pcs/cc, and it was confirmed that the powder body having a moisture content of 3.2% and a weight of 45 kg was obtained. The weight could be reduced to approximately one-fifth from the weight before processing.

Also, 40 kg of peach lees having a moisture content of 71.0% after beverage extraction was prepared and processed continuously for 18 hours under the above-described processing conditions in the processing apparatus 10 of the present embodiment with an ion density of about 60,000,000 pcs/cc, and it was confirmed that the powder body having a moisture content of 6.2% and a weight of 12 kg was obtained. The weight could be reduced to approximately one-fourth from the weight before processing.

Next, 231 kg of carrot lees having a moisture content of 87.1% after beverage extraction was prepared and processed continuously for 48 hours under the above-described processing conditions in the processing apparatus 10 of the present embodiment with an ion density of about 60,000,000 pcs/cc, and it was confirmed that the powder body having a moisture content of 2.8% and a weight of 24 kg was obtained. The weight could be reduced to approximately one-tenth from the weight before processing.

Next, 200 kg of green pepper lees having a moisture content of 84.4% after beverage extraction was prepared and processed continuously for 48 hours under the above-described processing conditions in the processing apparatus 10 of the present embodiment with an ion density of about 60,000,000 pcs/cc, and it was confirmed that the powder body having a moisture content of 12.1% and a weight of 68 kg was obtained. The weight could be reduced to approximately one-third from the weight before processing.

Next, 189 kg of liquor lees (containing wheat bran) having a moisture content of 45.0% after beverage extraction was prepared and processed continuously for 48 hours under the above-described processing conditions in the processing apparatus 10 of the present embodiment with an ion density of about 60,000,000 pcs/cc, and it was confirmed that the powder body having a moisture content of 3.5% and a weight of 96 kg was obtained. The weight could be reduced to approximately half the weight before processing.

Next, 106 kg of used green tea leaves having a moisture content of 86.4% after beverage extraction was prepared and processed continuously for 24 hours under the above-described processing conditions in the processing apparatus 10 of the present embodiment with an ion density of about 60,000,000 pcs/cc, and it was confirmed that the powder body having a moisture content of 2.3% and a weight of 17 kg was obtained. The weight could be reduced to approximately one-sixth from the weight before processing.

Next, 130 kg of barley tea residue having a moisture content of 80.2% after beverage extraction was prepared and processed continuously for 18 hours under the above-described processing conditions in the processing apparatus 10 of the present embodiment with an ion density of about 60,000,000 pcs/cc, and it was confirmed that the powder body having a moisture content of 20% or less and a weight of 69 kg was obtained. The weight could be reduced to approximately half the weight before processing.

Next, 303 kg of coffee grounds having a moisture content of 47.0% after beverage extraction was prepared and processed continuously for 68 hours under the above-described processing conditions in the processing apparatus 10 of the present embodiment with an ion density of about 60,000,000 pcs/cc, and it was confirmed that the powder body having a moisture content of 19.8% or less and a weight of 109 kg was obtained. The weight could be reduced to approximately one-third from the weight before processing.

(4) <Operation and Effects>

In the above-described configuration, the processing apparatus 10 stirs the water-containing organic matter stored in the processing tank 12 with the stirring unit 14 and heats the interior of the processing tank 12 by the heater 72. At the same time, the processing apparatus 10 exhausts gas from the processing tank 12 by the exhaust unit 61 at a rate ranging from 1 m³/min to 300 m³/min, and along with the exhaustion, supplies ion gas having an ion density of 2,000,000 pcs/cc or higher from the ion gas supply unit 15 to the processing tank 12 to process the water-containing organic matter.

In this manner, according to the processing apparatus 10, the water-containing organic matters are processed by using a method including stirring the water-containing organic matters, heating the interior of the processing tank 12, exhausting gas from the interior of the processing tank 12, and supplying ion gas to the water-containing organic matter, so that, compared to a case in the related art where the culture base material is used, the space in the processing tank 12 by an amount corresponding to the culture base material can be utilized efficiently, which may result in more efficient processing.

The processing apparatus 10 shifts the temperature in the processing tank 12 within the range from 25° C. to 70° C. by the heater 72 during the processing of the water-containing organic matter, sets the ion density to preferably 60,000,000 pcs/cc or higher, and performs the processing of the water-containing organic matter in the processing tank 12 continuously for a time period ranging from 2 hours to 70 hours. Accordingly, the processing apparatus 10 can produce a powder body having a moisture content of 20% or less from the water-containing organic matter.

The present embodiment is configured to introduce the water-containing organic matter from the bottom portion 20 of the processing tank 12 by the first stirring unit 74 rotating counterclockwise and the second stirring unit 76 rotating clockwise toward between the first stirring unit 74 and the second stirring unit 76, and injection gas toward the boundary between the water-containing organic matter between the first stirring unit 74 and the second stirring unit 76 and the space in the processing tank 12 filled with gas.

Accordingly, the processing apparatus 10 can inject ion gas uniformly over the entire water-containing organic matter scraped up between the first stirring unit 74 and the second stirring unit 76. In the present embodiment, the exhaust port 57 for exhausting gas in the processing tank 12 is provided above a portion between the first stirring unit 74 and the second stirring unit 76 and thus the water-containing organic matter is scraped up between the first stirring unit 74 and the second stirring unit 76, so that excessive vapor ascending from the water-containing organic matter can be exhausted to the outside as-is from the exhaust port 57.

According to the processing apparatus 10, the powder body obtained by a processing process including heating the water-containing organic matter while being stirred in the processing tank 12, and further, exhausting gas from the processing tank 12, and injecting ion gas onto the water-containing organic matter has a moisture content of 20% or less and has a high nutritional value, and thus can be used as a fertilizer and feed.

(5) <Other Embodiments>

The present invention is not limited to the embodiment described above and may be modified as needed within a scope of the gist of the present invention, and processing tanks having various sizes may be applied as the processing tank. In the embodiment described above, the negative ion generator 38A is provided as an ion gas supply unit, and the ion gas supply unit 15 configured to supply ion gas having an ion density of negative ion of 2,000,000 pcs/cc or higher, preferably 20,000,000 pcs/cc or higher, and further preferably 60,000,000 pcs/cc or higher to the processing tank 12 is applied. However, the invention is not limited thereto, and a positive ion generator is provided and an ion gas supply unit configured to supply ion gas having an ion density of positive ion of 2,000,000 pcs/cc or higher, preferably 20,000,000 pcs/cc or higher, and further preferably 60,000,000 pcs/cc or higher to the processing tank 12 is also applicable.

As another ion gas supply unit, an ion gas supply unit provided with an ion generator generating both positive ions and negative ions and configured to supply ion gas having an ion density including the positive ions and the negative ions of 2,000,000 pcs/cc or higher, preferably 20,000,000 pcs/cc or higher, and further preferably 60,000,000 pcs/cc or higher to the processing tank 12 is also applicable.

The direction of rotation of the first stirring unit 74 and the second stirring unit 76 may be any directions, and a stirring unit including a rotating shaft and blades provided on the rotating shaft may be applied in the processing tank 12. The upper supply tube configured to supply ion gas into the processing tank 12 is configured to include the first pipe 64 and the second pipe 66 provided on both sides with the exhaust port 57 interposed therebetween. However, such a configuration is also applicable in which only one of the first pipe 64 and the second pipe 66 is provided for supplying ion gas into the processing tank 12.

In the embodiment described above, a case where a blower is provided as the exhaust unit 61 to forcedly exhaust gas from the interior of the processing tank 12 has been described. However, the present invention is not limited thereto. For example, such a configuration is also applicable in which a blower which serves as a suction unit is provided in the negative ion generator 38A on the suction side, a simple filter is employed as the exhaust unit, and gas in the processing tank 12 is exhausted from the exhaust unit by suction with the suction unit at a rate ranging from 1 m³/min to 300 m³/min.

(6) <Verification Test on Powder Body Manufactured by Processing Apparatus of Present Embodiment>

Next, a powder body was manufactured by processing strained lees of apple juice remaining when apple juice was manufactured by using the processing apparatus 10 of the present embodiment. From coffee grounds as well, a powder body was manufactured by processing by using the processing apparatus 10 of the present embodiment.

In this case, gas was exhausted from the processing tank at 50 m³/min, the ion density of ion gas to be supplied into the processing tank 12 was maintained at 60,000,000 pcs/cc or higher, the temperature in the processing tank 12 during processing of the water-containing organic matter was shifted within a temperature range from 20° C. to 70° C., and such a process was continuously performed for approximately 20 hours, so that powder bodies were manufactured from strained lees of apple juice and coffee grounds, respectively. Strained lees of apple juice and coffee grounds used in this verification test were different from the strained lees of apple juice and the coffee grounds described in the above-described "(3) <Fertilizer or Feed>" of the example.

A powder body manufactured by processing the strained lees of apple juice using the processing apparatus 10 of the present embodiment (hereinafter referred to as "apple-lees-processed powder body"), a powder body manufactured by processing coffee grounds using the processing apparatus 10 of the present embodiment (hereinafter, referred to as "coffee-grounds-processed powder body") were observed focusing on re-absorbance of moisture after long term storage without specific measure such as tight seal or the like.

Specifically, a flexible container bag (manufactured by Atsuta Shizai Co., Ltd., product name AS-002F (one-way container bag)) with a capacity of 1000 kg was prepared, which was formed from a sheet woven with strong chemical fibers such as polyethylene and polypropylene.

On Jun. 20, 2019, at a factory in Hirosaki City, Aomori Prefecture, Japan, the above-described apple-lees-processed powder body was made, the apple-lees-processed powder body was put into the flexible container bags, and each of flexible container bags was filled entirely with the apple-lees-processed powder body. Then, openings of the flexible container bags filled with the apple-lees-processed powder body were tied and sealed.

The flexible container bags filled with the apple-lees-processed powder body were simply laid out in a warehouse on the premises of the above-described factory (Hirosaki City, Aomori Prefecture, Japan) without stacking and left untouched. The warehouse, where the flexible container bags were left had side walls made of concrete blocks and a roof made of tin, was not equipped with any particular insulation, and was protected against rain and wind.

The coffee-grounds-processed powder body was packed into flexible container bags in the same manner, and the openings were tied and sealed and were left in the same warehouse where the flexible container bags filled with the apple-lees-processed powder body were left in the same manner.

The moisture contents of the apple-lees-processed powder body and the coffee-grounds-processed powder body were measured respectively when they were packed in the flexible container bags to start the verification test. The moisture contents in this verification test were the values measured by the loss on drying method. The loss on drying method includes measuring the weight of the water-containing organic matter before processing containing water, heating the water-containing organic matter to evaporate water, then measuring the weight of the water-containing organic matter with zero moisture, thereby assuming the reduced weight to be moisture to measure the moisture content.

The verification test on the apple-lees-processed powder body was started on Jun. 20, 2019, and the moisture content at the start of the verification test was 11.8%. Then, the flexible container bags filled with the apple-lees-processed powder body were continued to be left at room temperature in the warehouse in Hirosaki City, Aomori Prefecture, Japan as described above, and the moisture content was measured again for the apple-lees-processed powder body in the flexible container bags on Jan. 7, 2020.

As for the timing of the verification test, a period (June 2019 to January 2020) when the system was exposed to environments in summer (30° C.) and winter (−10° C.) in order to check the effects of seasonal changes and temperature fluctuations and so on.

The moisture content of the apple-lees-processed powder body in the flexible container bags left in the warehouse from Jun. 20, 2019, to Jan. 7, 2020 was 12.2%. The bacteria count check and the like were conducted on the apple-lees-processed powder body during the verification test, and thus the flexible container bags were opened approximately every month. From the results of the verification tests described above, it was confirmed that the apple-lees-processed powder body manufactured by the processing apparatus 10 of the present embodiment can reduce the moisture content to 20% or less at the time of manufacture and can maintain the moisture content at 20% or less which was the measured at the time of manufacture for a long period of time.

The verification test on the coffee-grounds-processed powder body was started on Jul. 6, 2019 and the moisture content at the start of the verification test was 9.4%. Then, the flexible container bags filled with the coffee-grounds-processed powder body were continued to be left at room temperature in the warehouse in Hirosaki City, Aomori Prefecture, Japan as described above, and the moisture content was measured again also for the coffee-grounds-processed powder body in the flexible container bags on Jan. 7, 2020.

The moisture content of the coffee-grounds-processed powder body in the flexible container bags left in the warehouse from Jul. 6, 2019 to Jan. 7, 2020 was 9.4%. From this result, it was confirmed that the moisture content of the coffee-grounds-processed powder body with a moisture content of 20% or less at the time of manufacture could be maintained at 20% or less without change for a long period of time.

REFERENCE SIGNS LIST

10: processing apparatus
12: processing tank
14: stirring unit
15: ion gas supply unit
38A: ion generator
61: exhaust unit
72: heater

The invention claimed is:

1. A processing apparatus for processing water-containing organic matters comprising:
   a processing tank configured to store the water-containing organic matters;
   a stirring unit configured to stir the water-containing organic matters stored in the processing tank;
   a heater configured to heat an interior of the processing tank;
   an exhaust unit configured to exhaust gas from the processing tank at a rate from 1 m³/min to 300 m³/min; and
   an ion gas supply unit configured to supply ion gas into the processing tank with exhaustion of the gas from the processing tank, the ion gas having an ion density of at least 2,000,000 pcs/cc, wherein the heater heats the interior of the processing tank while the stirring unit stirs the water-containing organic matters, and the ion gas is supplied into the processing tank according to the exhaustion by the exhaust unit, whereby processing the water-containing organic matters.

2. The processing apparatus according to claim 1, wherein the stirring unit includes:

a first stirring unit disposed on one side of the processing tank in a short-side direction; and a second stirring unit disposed on other side of the processing tank in the short-side direction, the first stirring unit rotating counterclockwise, and the second stirring unit rotating clockwise, and the ion gas supply unit injects ion gas toward a boundary between the water-containing organic matter introduced from a bottom portion of the processing tank toward between the first stirring unit rotating counterclockwise and the second stirring unit rotating clockwise by being stirred by the first stirring unit and the second stirring unit and a space in the processing tank filled with gas.

3. A processing method for processing water-containing organic matters comprising:

storing the water-containing organic matters in a processing tank;

stirring the water-containing organic matters stored in the processing tank by a stirring unit;

heating an interior of the processing tank by a heater;

exhausting gas from the interior of the processing tank by an exhaust unit at a rate from 1 m$^3$/min to 300 m$^3$/min; and supplying ion gas into the processing tank with exhaustion of the gas from the processing tank, the ion gas having an ion density of at least 2,000,000 pcs/cc, wherein the heater heats the interior of the processing tank while the stirring unit stirs the water-containing organic matters, and the ion gas is supplied into the processing tank according to the exhaustion by the exhaust unit, whereby processing the water-containing organic matters.

4. The processing method according to claim 3, wherein the heating includes shifting a temperature in the interior of the processing tank within a temperature range from 25° C. to 70° C. by the heater, and adjusting an average temperature in the processing tank to the temperature range from 30° C. to 50° C. at a time of completion of processing, and a powder body having a moisture content of 20% or less and a bacterial count of mesophilic aerobic bacteria of $10^5$/g or less and used for a fertilizer or feed is manufactured.

5. The processing method according to claim 4, wherein the storing includes storing the water-containing organic matter having a moisture content ranging from 40% to 90% in the processing tank, and the powder body is manufactured by continuously processing the water-containing organic matter for a time period from 2 hours to 70 hours.

6. The processing method according to claim 4, wherein the water-containing organic matters is apple lees or coffee grounds, which is an organic residue after beverage extraction and a powder body made from the apple lees or the coffee grounds is manufactured.

* * * * *